United States Patent
Kashyap et al.

(10) Patent No.: US 12,440,193 B2
(45) Date of Patent: Oct. 14, 2025

(54) SYSTEM, METHOD AND APPARATUS FOR FORMING MACHINE LEARNING SESSIONS

(71) Applicant: Toi Labs, Inc., San Francisco, CA (US)

(72) Inventors: Vikram Kashyap, San Francisco, CA (US); Dan Cheung, San Francisco, CA (US); Ting-Hsuan Lin, San Francisco, CA (US); Gabrielle Kim, San Francisco, CA (US); Parmoon Sarmadi, San Francisco, CA (US)

(73) Assignee: Toi Labs, Inc., San Francisco, CA (US)

( * ) Notice: Subject to any disclaimer, the term of this patent is extended or adjusted under 35 U.S.C. 154(b) by 120 days.

(21) Appl. No.: 18/144,815

(22) Filed: May 8, 2023

(65) Prior Publication Data
US 2023/0277162 A1 Sep. 7, 2023

Related U.S. Application Data

(63) Continuation-in-part of application No. 17/701,799, filed on Mar. 23, 2022, now Pat. No. 12,089,822.
(Continued)

(51) Int. Cl.
*E03D 11/13* (2006.01)
*A61B 10/00* (2006.01)
(Continued)

(52) U.S. Cl.
CPC ........ *A61B 10/0038* (2013.01); *A61B 10/007* (2013.01); *E03D 11/13* (2013.01);
(Continued)

(58) Field of Classification Search
CPC .. G01N 33/4833; H04N 5/332; A61B 10/007; E03D 11/13; G06T 7/0012
See application file for complete search history.

(56) References Cited

U.S. PATENT DOCUMENTS

| | | |
|---|---|---|
| 3,727,242 A | 4/1973 | Miller |
| 4,697,656 A | 10/1987 | de Canecaude |
| | (Continued) | |

FOREIGN PATENT DOCUMENTS

| | | |
|---|---|---|
| CA | 3055079 A1 | 10/2018 |
| CN | 1928555 A | 3/2007 |
| | (Continued) | |

OTHER PUBLICATIONS

Seung-min Park, "A mountable toilet system for personalized health monitoring via the analysis of excreta", 2020 (Year: 2020).*
(Continued)

*Primary Examiner* — Maurice C Smith
(74) *Attorney, Agent, or Firm* — Spectrum IP Law Group LLC

(57) ABSTRACT

The disclosed embodiments relate to system, method and apparatus for forming ML sessions so that an AI system can identify, track and diagnose a user through the user's bathroom sessions. As used herein, a session is a period of time during which a user is active in the toilet. The session may include certain inactivity if such inactivity lasts only for a predefined duration. In an exemplary embodiment, a system is configured to capture images of excreta and, using ML algorithms, classifies the toileting session using Digital Biomarkers (DBMs). The ability to create an excreta log to accurately deliver detailed information to doctors and healthcare providers can revolutionize healthcare by notifying when further urine or fecal screening is necessary. The disclosed embodiments of ML and image identification through AI requires no user behavior change and provides a link between medical records and specific excreta patterns.

41 Claims, 11 Drawing Sheets

Related U.S. Application Data which is a continuation of application No. 16/446,111, filed on Jun. 19, 2019, now Pat. No. 11,298,112, which is a continuation of application No. 16/016,559, filed on Jun. 23, 2018, now Pat. No. 10,376,246, which is a continuation of application No. PCT/US2018/026618, filed on Apr. 6, 2018, application No. 18/144,815, filed on May 8, 2023 is a continuation-in-part of application No. 17/432,955, filed on Aug. 23, 2021.

(60) Provisional application No. 63/339,407, filed on May 6, 2022, provisional application No. 62/482,912, filed on Apr. 7, 2017.

(51) Int. Cl.
| | |
|---|---|
| G01N 21/31 | (2006.01) |
| G01N 33/483 | (2006.01) |
| G01N 33/49 | (2006.01) |
| G01N 33/493 | (2006.01) |
| H04N 23/11 | (2023.01) |
| H04N 25/76 | (2023.01) |
| G01G 19/50 | (2006.01) |
| G01G 21/28 | (2006.01) |

(52) U.S. Cl.
CPC ......... *G01N 21/31* (2013.01); *G01N 33/4833* (2013.01); *G01N 33/49* (2013.01); *G01N 33/493* (2013.01); *H04N 23/11* (2023.01); *H04N 25/76* (2023.01); *A61B 2010/0083* (2013.01); *G01G 19/50* (2013.01); *G01G 21/28* (2013.01)

(56) References Cited

U.S. PATENT DOCUMENTS

| | | | |
|---|---|---|---|
| 5,111,539 | A | 5/1992 | Hiruta et al. |
| 5,184,359 | A | 2/1993 | Tsukamura et al. |
| 5,276,595 | A | 1/1994 | Patrie |
| 5,567,052 | A | 10/1996 | Yoshiike et al. |
| 5,986,701 | A | 11/1999 | Anderson et al. |
| 6,077,222 | A | 6/2000 | Lloyd et al. |
| 6,263,089 | B1 | 7/2001 | Otsuka et al. |
| 7,002,480 | B2 | 2/2006 | Kobayashi et al. |
| 7,241,578 | B2 | 7/2007 | Yugawa et al. |
| 7,760,332 | B2 | 7/2010 | Yamaguchi |
| 8,723,118 | B2 | 5/2014 | Mceldowney et al. |
| 8,802,442 | B2 | 8/2014 | Wheeldon et al. |
| 9,025,019 | B2 | 5/2015 | Meinherz et al. |
| 9,416,524 | B2 | 8/2016 | Hall et al. |
| 9,592,034 | B2 | 3/2017 | Hall et al. |
| 9,595,185 | B1 | 3/2017 | Hall et al. |
| 9,671,343 | B1 | 6/2017 | Hall et al. |
| 9,737,181 | B1 | 8/2017 | Hall et al. |
| 9,756,297 | B1 | 9/2017 | Clements |
| 9,757,097 | B2 | 9/2017 | Hall et al. |
| 9,766,257 | B1 | 9/2017 | Hall et al. |
| 9,775,586 | B2 | 10/2017 | Hall et al. |
| 9,801,508 | B1 | 10/2017 | Hall et al. |
| 9,810,686 | B1 | 11/2017 | Hall et al. |
| 9,822,519 | B2 | 11/2017 | Hall et al. |
| 9,845,593 | B2 | 12/2017 | Hall et al. |
| 9,867,513 | B1 | 1/2018 | Hall et al. |
| 9,880,138 | B1 | 1/2018 | Hall et al. |
| 10,360,473 | B2 | 7/2019 | Dixon et al. |
| 2003/0074731 | A1 | 4/2003 | Sumino |
| 2005/0010128 | A1 | 1/2005 | Shiraishi et al. |
| 2005/0261605 | A1 | 11/2005 | Shemer et al. |
| 2006/0155175 | A1 | 7/2006 | Ogino et al. |
| 2008/0301865 | A1 | 12/2008 | Hand |
| 2009/0216099 | A1 | 8/2009 | Kim |
| 2009/0279074 | A1 | 11/2009 | Seaver |
| 2010/0170722 | A1 | 7/2010 | Maeda |
| 2010/0205722 | A1 | 8/2010 | Kim |
| 2011/0157596 | A1 | 6/2011 | Wax et al. |
| 2012/0023651 | A1 | 2/2012 | Taylor et al. |
| 2013/0223472 | A1 | 8/2013 | Maston |
| 2014/0083780 | A1 | 3/2014 | Tsutaya et al. |
| 2014/0165279 | A1 | 6/2014 | Plugovoy |
| 2014/0222349 | A1 | 8/2014 | Higgins et al. |
| 2015/0042834 | A1 | 2/2015 | Miao et al. |
| 2015/0060647 | A1 | 3/2015 | Sakamoto et al. |
| 2015/0324564 | A1 | 11/2015 | Sahu et al. |
| 2015/0342574 | A1 | 12/2015 | Hall et al. |
| 2015/0342575 | A1 | 12/2015 | Hall et al. |
| 2016/0042507 | A1 | 2/2016 | Turner et al. |
| 2016/0145844 | A1 | 5/2016 | Veros et al. |
| 2016/0221120 | A1 | 8/2016 | Narita et al. |
| 2016/0252490 | A1 | 9/2016 | Shirata et al. |
| 2016/0271418 | A1 | 9/2016 | Ferolito |
| 2016/0316978 | A1 | 11/2016 | Peng et al. |
| 2016/0374619 | A1 | 12/2016 | Borkholder et al. |
| 2017/0022536 | A1 | 1/2017 | Velazquez et al. |
| 2017/0030751 | A1 | 2/2017 | Liu et al. |
| 2017/0089875 | A1 | 3/2017 | Hasegawa et al. |
| 2017/0130439 | A1 | 5/2017 | Kleinsasser et al. |
| 2017/0198464 | A1 | 7/2017 | Hall et al. |
| 2017/0198466 | A1 | 7/2017 | Hall et al. |
| 2017/0198468 | A1 | 7/2017 | Hall et al. |
| 2017/0204595 | A1 | 7/2017 | Hall et al. |
| 2017/0251996 | A1 | 9/2017 | Hall et al. |
| 2017/0254060 | A1 | 9/2017 | Hall et al. |
| 2017/0254526 | A1 | 9/2017 | Hall et al. |
| 2017/0303846 | A1 | 10/2017 | O'brien et al. |
| 2017/0303901 | A1 | 10/2017 | Sekine |
| 2017/0307512 | A1 | 10/2017 | Akagawa et al. |
| 2017/0307515 | A1 | 10/2017 | Nawata et al. |
| 2017/0322197 | A1 | 11/2017 | Hall et al. |
| 2018/0000417 | A1 | 1/2018 | Hall et al. |
| 2018/0020889 | A1 | 1/2018 | Hall et al. |
| 2018/0020984 | A1 | 1/2018 | Hall et al. |
| 2018/0052955 | A1 | 2/2018 | Hall et al. |
| 2018/0055488 | A1 | 3/2018 | Hall et al. |
| 2018/0058936 | A1 | 3/2018 | Sun et al. |
| 2018/0092602 | A1 | 4/2018 | Hall et al. |
| 2018/0153414 | A1 | 6/2018 | Hall et al. |
| 2018/0184906 | A1 | 7/2018 | Prokopp |
| 2018/0255989 | A1 | 9/2018 | Käppeli et al. |
| 2018/0303466 | A1 | 10/2018 | Kashyap et al. |
| 2018/0368818 | A1 | 12/2018 | Oguri et al. |
| 2019/0017994 | A1 | 1/2019 | Tsuruoka et al. |
| 2019/0250891 | A1 | 8/2019 | Kumar et al. |
| 2019/0277710 | A1 | 9/2019 | Zhou |
| 2019/0298316 | A1 | 10/2019 | Kashyap et al. |
| 2020/0008786 | A1 | 1/2020 | Sekine et al. |
| 2021/0035289 | A1 | 2/2021 | Zedayko et al. |
| 2021/0310227 | A1 | 10/2021 | Kramer et al. |
| 2022/0151510 | A1 | 5/2022 | Kashyap et al. |

FOREIGN PATENT DOCUMENTS

| | | | |
|---|---|---|---|
| CN | 104254621 | A | 12/2014 |
| CN | 108255206 | A | 7/2018 |
| CN | 109008759 | A | 12/2018 |
| CN | 110461219 | A | 11/2019 |
| CN | 113095347 | A * | 7/2021 |
| DE | 102010061035 | B4 | 10/2012 |
| EP | 3406811 | A1 | 11/2018 |
| EP | 3606412 | A2 | 2/2020 |
| JP | H0367638 | U | 7/1991 |
| JP | 2000166818 | A | 6/2000 |
| JP | 2001004531 | A | 1/2001 |
| JP | 2001070201 | A | 3/2001 |
| JP | 2001128899 | A | 5/2001 |
| JP | 2004097302 | A | 4/2004 |
| JP | 2006061296 | A | 3/2006 |
| JP | 2006090931 | A | 4/2006 |
| JP | 2006274710 | A | 10/2006 |
| JP | 2007000204 | A | 1/2007 |
| JP | 2007252805 | A | 10/2007 |
| JP | 2008038334 | A | 2/2008 |

(56) References Cited

FOREIGN PATENT DOCUMENTS

| | | | |
|---|---|---|---|
| JP | 2009229315 A | 10/2009 | |
| JP | 2009270951 A | 11/2009 | |
| JP | 2013526900 A | 6/2013 | |
| JP | 2016004005 A | 1/2016 | |
| JP | 2016108870 A | 6/2016 | |
| JP | 2017012971 A | 1/2017 | |
| JP | 20014531 | 1/2021 | |
| JP | 2022521214 A | 4/2022 | |
| KR | 20170030018 A | 3/2017 | |
| KR | 20190140448 A | 12/2019 | |
| KR | 102468412 B1 | 11/2022 | |
| WO | 2015194405 A1 | 12/2015 | |
| WO | 2016135735 A1 | 9/2016 | |
| WO | 2018042431 A1 | 3/2018 | |
| WO | 2018187790 A2 | 10/2018 | |
| WO | 2020224282 A1 | 11/2020 | |

OTHER PUBLICATIONS

Jie Li, "Safety Helmet Wearing Detection Based on Image Processing and Machine Learning" 2014 (Year: 2014).*
Extended European Search Report and Search Opinion mailed Nov. 24, 2020 for EP 18780773.
Notification of reasons for revocation by Japanese Patent Office—English Language.
AXIS Communications: CCD and CMOS sensor technology ("Axis"). Axis became publicly accessible on Jul. 17, 2011 (web.archive.org/web/20110717202417/https://www.axis.com.files/whitepaper/wp_ccd_cmos_40711_en_1010_lo.pdf, 8 pages.
Elkins, K., "Rapid Presumptive 'Fingerprinting' of Body Fluids and Materials by ATR FT-IR Spectroscopy," Journal of Forensic Sciences, 2011, 1580-1587(6)(Abstract).
Extended European Search Report and Search Opinion mailed Nov. 24, 2020 in European Patent Application No. 18780773.0.
Extended European Search Report and Search Opinion mailed Oct. 24, 2022 for EP 20759880.
Gruber, B., et al., "Breath gas monitoring during a glucose challenge by a combined PTR-QMS/GCxGC-TOFMS approach for the verification of potential volatile biomarkers," Journal of Breath Research, 2016, 036003 10 (Abstract).
Hachuel et al., Augmenting Gastrointestinal Health: A Deep Learning Approach to Human Stool Recognition and Characterization in Macroscopic Images. arXiv:1903.10578 [online], Mar. 25, 2019 (Mar. 25, 2019) [Retrieved on Oct. 25, 2022], Retrieved from the Internet.
International Preliminary Report on Patentability mailed Aug. 10, 2021 in PCT/US2020/019383.
International Preliminary Report on Patentability mailed Dec. 14, 2023 in PCT/US2022/036237.
International Preliminary Report on Patentability mailed Nov. 17, 2022 in PCT/US2021/030036.
International Preliminary Report on Patentability mailed Oct. 8, 2019 in PCT/US2018/026618.
International Preliminary Report on Patentability mailed Sep. 24, 2024 in PCT/US2023/021422.
International Search Report and Written Opinion mailed Aug. 10, 2021 in PCT/US21/30036.
International Search Report and Written Opinion mailed Aug. 4, 2023 in PCT/2023/021422.
International Search Report and Written Opinion mailed May 11, 2020 in PCT/US2020/019383.
International Search Report and Written Opinion mailed Nov. 15, 2022 in PCT/US2022/036237.
International Search Report and Written Opinion mailed Sep. 21, 2018 in PCT/US2018/026618.
Janssen, I., et al., " Estimation of skeletal muscle mass by biolelectrical impedance analysis," Journal of Applied Physiology, 2000, 465-471(89).
Lee, D., "A prototype high sensitivity load cell using single walled carbon nanotube strain gauges," 2012.
Melexis, "Far infrared thermal sensor array (32×24 RES)," https://www.melexis.com/en/product/MLX90640/Far-Infrared-Thermal-Sensor-Array, Nov. 3, 2016.
Office Action mailed Feb. 3, 2022 in Japanese Patent Application No. 2020504284.
Petition in Opposition to Granted Patent mailed Jun. 20, 2023 in U.S. Pat. No. 7,193,526.
Zheng, X., et al., "The footprints of gut microbial-mammalian co-metabolism," Journal of Proteome Research, 2011, 5512-5522, 10.

* cited by examiner

| Labels | Sensor Data | Behavior | Behavioral Session Rules |
|---|---|---|---|
| Non-flushing | Optical Train | Non-flushing | Continue to track for clean bowl, if not, then create a new session on new urine stream and only look for the data for new excreta |
| User Movement | Optical Train, Capacitive Sensor | User Movement | Collapse sequences into sessions by extending the session timeout interval due to detection of user movement from the sensors |

*Fig. 8*

SYSTEM, METHOD AND APPARATUS FOR FORMING MACHINE LEARNING SESSIONS

The instant application claims priority to the U.S. Provisional Application Ser. No. 63/339,407, filed May 6, 2022. The instant application is a Continuation-in-Part (CIP) of U.S. application Ser. No. 17/701,799, filed Mar. 23, 2022, which is a continuation of and claims priority to application Ser. No. 16/446,111, filed Jun. 19, 2019 (Pat. No. 11,298,112), which is a continuation of application Ser. No. 16/016,559, filed Jun. 23, 2018 (Pat. No. 10,376,246), which is a continuation of International Application Serial No. PCT/US2018/026618, filed Apr. 6, 2018, which claims priority to Provisional Application Ser. No. 62/482,912, filed Apr. 7, 2017. The instant application is also a CIP of application Ser. No. 17/432,955, filed Aug. 23, 2021, which claims § 371 priority to International Application Serial No. PCT/US2020/019383 filed Aug. 23, 2021, which claims priority to Provisional Application Nos. 62/809,522 (filed Feb. 22, 2019), 62/900,309 (filed Sep. 13, 2019) and 62/959,139 (filed Jan. 9, 2020), the specifications of which are incorporated herein in their entireties.

BACKGROUND

A number of health conditions can be detected from the visual characteristics of human excreta. The best way to lower costs and treat these conditions effectively is early diagnosis and treatment. Current clinical management for these conditions, as well as many others, include monitoring and documenting specific excreta characteristics such as urine color, urination frequency, urine duration, stool color, stool frequency and stool consistency.

Documenting these characteristics is currently an effective way to screen for and track conditions such as urinary tract infections, infectious diarrhea, dehydration, chronic kidney disease, cancers, gastrointestinal bleeding, inflammatory bowel disease, and constipation. Many of these conditions lead to hospitalizations, readmissions, and disease progression if they are not diagnosed and treated early. Today, documenting these characteristics is often labor intensive and abnormalities are not identified in an accurate or timely manner. For example, in senior care facilities it has been demonstrated that clinically concerning changes to excreta are often not identified within 24 hours of onset.

BRIEF DESCRIPTION OF THE DRAWINGS

Various implementations of the disclosed principles are illustrated in reference with the following exemplary and non-limiting drawings, in which similar elements are numbered similarly, and where:

FIG. 8 shows exemplary session rules to account for user's behavior; and

DETAILED DESCRIPTION

Figure 1:
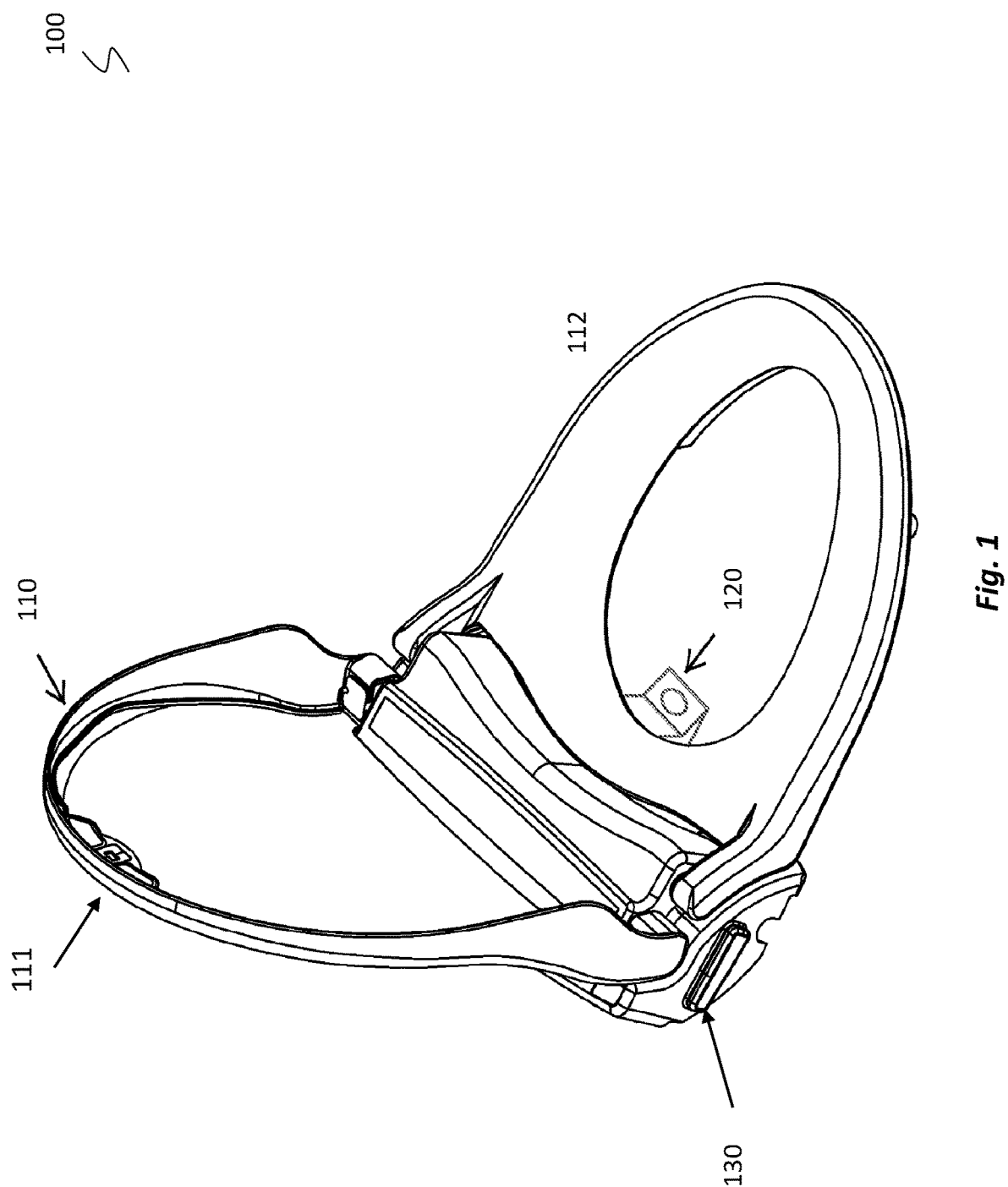
FIG. 1 is an exemplary toilet seat according to one embodiment of the disclosure.

In the following description, numerous specific details are set forth in order to provide a thorough understanding of various embodiments. However, various embodiments may be practiced without the specific details. In other instances, well known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof. Any reference to circuitry or microcircuitry is intended to include hardware and optionally software required to perform the desired task. Such circuitry may also be used for wireless communication from the toilet to one or more remote servers configured to receive the acquired information to obtain the desired information. The machine language or artificial intelligence disclosed herein may run at a remote location (e.g., server or processor) or may be integrated within the toilet as disclosed herein.

References to "one embodiment," "an embodiment," "example embodiment," "various embodiments," etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first," "second," "third," etc., to describe a common element, merely indicate that different instances of like elements are being referred to, and are not intended to imply that the elements so described must be in a given sequence, either temporally, spatially, in ranking, or in any other manner.

Discussions herein utilizing terms such as, for example, "processing," "computing," "calculating," "determining," "establishing," "analyzing," "checking," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The disclosed embodiments relate to system, method and apparatus for forming ML sessions so that an AI system can identify, track and diagnose a user through the user's bathroom sessions (as used herein, "event(s)" or "session(s)"). As used herein, a session is a period of time during which a user is active in the toilet. The session may include certain inactivity if such inactivity lasts only for a predefined duration.

In an exemplary embodiment, a system is configured to capture images of excreta and, using ML algorithms, classifies the toileting session using Digital Biomarkers (DBMs). The ability to create an excreta log to accurately deliver detailed information to doctors and healthcare providers can revolutionize healthcare by notifying when further urine or fecal screening is necessary. The disclosed embodiments of ML and image identification through AI requires no user behavior change and provides a link between medical records and specific excreta patterns.

In certain embodiments, the system may be able to determine links between these excreta logs and the onset of specific diseases. In an exemplary study reported herein, the exemplary system excreta records were collected and were compared against each other and against patients' deidentified medical records to provide correlative data between excreta logs and acute episodes, such as cloudy urine, suspected blood, diarrhea and constipation. The correlation can establish condition threshold for each type of acute episode and establish individual condition thresholds for reporting to healthcare professionals.

In an exemplary embodiment, the disclosure uses an Internet-connected replacement toilet seat that continuously captures bowel movements and urinations using time-lapse imaging. The toilet seat may comprise one or more sensors. The sensor instrument may incorporate hardware (i.e., the toilet seat), as well as a software component (i.e., analysis software created via machine learning models). After the toilet sensor captures time-lapse images of the contents going into the toilet bowl, these images are redirected to the system's software component. The software component analyzes the captured images to report stool and urine characteristics such as frequency of excretions, stool consistency, stool color and urine color that fall outside normal ranges.

Data captured by the toilet sensor may be transferred to a cloud server. The data findings may be then analyzed further on a cloud server and then by human reviewers to validate the identified stool and urine characteristics. While in certain embodiments reported herein, data is analyzed on one or more cloud servers, the disclosed principles are not limited thereto. For example, data may be collected and locally analyzed and stored at the instrument.

The detection system may comprise one or more illumination source, lens, optical train, toilet seat, sensor (e.g., temperature, range, capacitive, bioelectrical impedance), fixture bracket, analysis circuitry and communication circuitry. In one embodiment, the bioelectrical impedance refers to bioelectrical impendence through the user's body with the user sitting on the toilet. Conventional bioelectrical impedance measurement may be used for this purpose. The circuitry may comprise one or more electronic circuitry (e.g., microprocessors and memory circuitry) configured to receive optical images from the lens and the optical train, convert the images to digital data and optionally analyze the converted digital data according to a predefined algorithm.

The detection system which may include optical components, software/firmware and sensors may be integrated with the toilet seat or may be affixed to the toilet seat or the toilet with fixture and brackets. In an integrated embodiment, the toilet seat may comprise circuitry including hardware, software and firmware configured to collect data, analyze data and store the data and its results. A communication module added to the detection instrument may further comprise communication circuitry to communicate, for example wirelessly, data results intermittently or on as needed basis.

FIG. 1 is an exemplary toilet seat according to one embodiment of the disclosure. Specifically, FIG. 1 shows toilet seat assembly 100, having a lid 110, rim 112 and detection system 120. Assembly 100 may be integrated with a toilet (not shown) or may be added to a toilet (not shown). Lid 110 may further comprise sensor components (not shown) to open when a user is nearby. Detection system 120 may comprise various modules to implement the disclosed steps. In one application, detection system 120 may comprise optical detection modules (not shown) including one or more lenses (as an optical train) and/or an IR detection module to detect or view urine or excrement. Detection system 120 may also comprise an illumination source, a temperature sensor (e.g., temperature), analysis circuitry and communication circuitry. A fixture bracket (not shown) may be used to affix the detection sensor to rim 112 or the toilet (not shown). Detection system 120 may also include one or more electronic circuitries (e.g., microprocessors and memory circuitry) configured to receive optical images from the optical train (not shown) and convert the optical images to digital data. The electronic circuitry(ies) may be configured according to the disclosed principles to analyze the converted digital data according to a predefined algorithm. Detection system 120 may comprise memory components to store and implement the predefined algorithms. As discussed below, the algorithms may be implemented AI to identify disease or anomalies of interest. In one embodiment, the AI algorithms are stored in memory circuitry as software or firmware (not shown) integrated with detection system 120. Reference is made to International Application Nos. PCT/US2018/026618 (filed Apr. 6, 2018) and PCT/US2020/019383 (filed Aug. 23, 2021), the specifications of which are incorporated herein in their entities for background information.

In an exemplary embodiment, the toilet may include a so-called guest button 130 with may be used by a guest (non-regular user) to activate a guest session. The guest button may be pressed or otherwise engaged to start obtaining and storing data from the guest user. Additional interface may be provided (not shown) to allow the guest to enter data thereby associating the guest data with the guest's identity. The guest information may also be detected from the guest's electronic devices (e.g., smart phone or smart watch) by using near-field communication and Bluetooth. In such embodiments, the toilet system may communicate directly with the user's smart devices and request permission to identify the guest user. The user may then optionally grant permission to the system to associate and identify the recorded guest data.

In one embodiment, the disclosure relates to algorithms that may be implemented as an AI to identify disease or anomalies of interest. The AI application may be implemented as software or firmware on one or more electronic circuitries to identify and detect disease or health anomalies of the toilet user. Moreover, the user's bathroom habits and excrement may be used to track the user's health over time. The AI may be trained using ML according to the disclosed embodiments.

Figure 2:
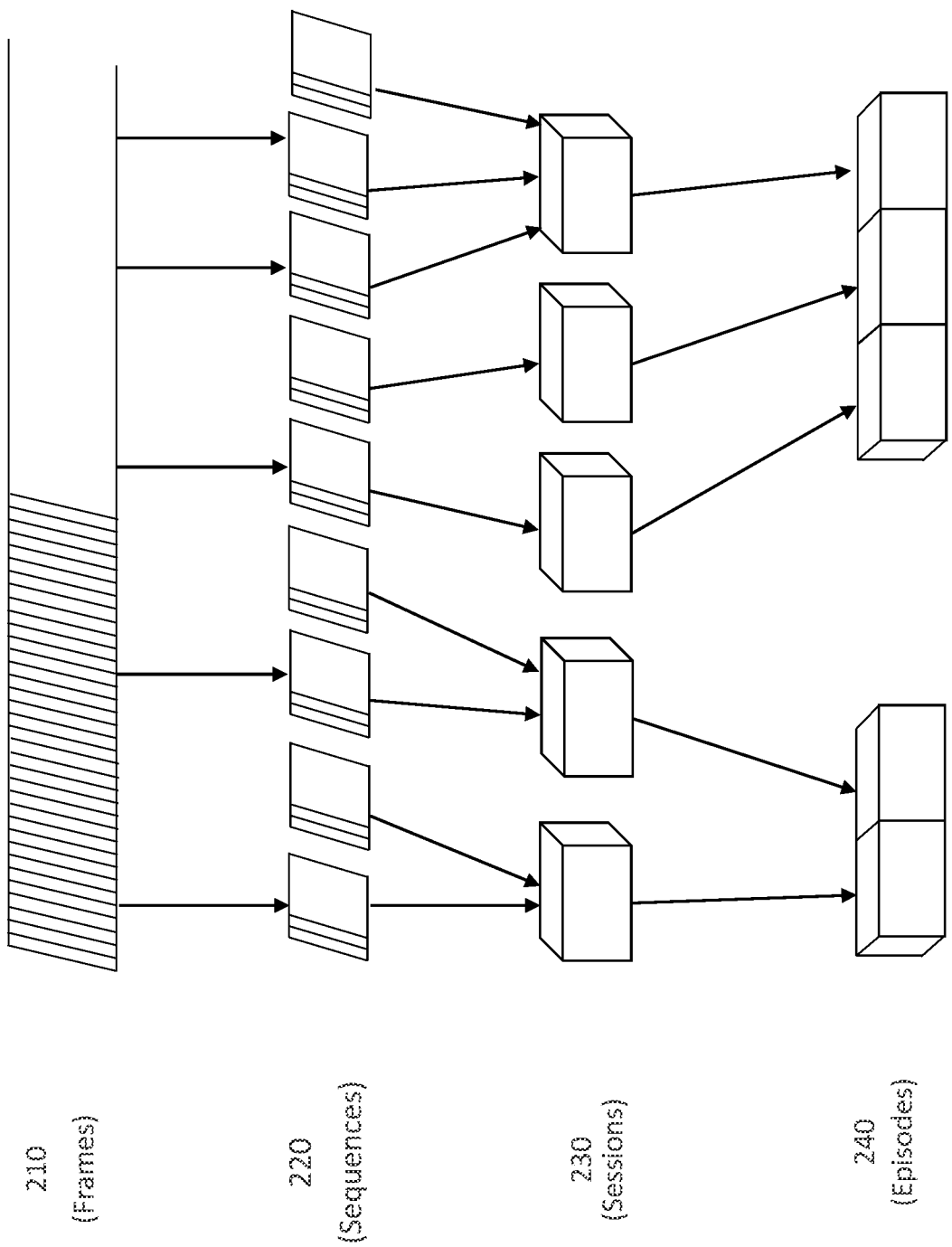
FIG. 2 illustrates a data collection flow diagram from a user's toileting session.

FIG. 2 illustrates a data collection flow diagram from a user's toileting session. The flow diagram may be used to allow the ML system to call out (filter) events of medical significance. In one exemplary embodiment, the ML system may be trained to identify and label the significant event and produce a labeled result to show the event of significance. Specifically, FIG. 2 shows the collection of frames as a sample image when the user starts using the toilet. In certain embodiments, the user's session is recorded when a range sensor 111 in toilet lid 110 (FIG. 1) is activated or if a capacitive sensor (not shown) inside rim 112 is activated. Frames may be recorded at a predefined rate, for example, at 30-60 frames per second. The frames are then grouped into sequences 220. A sequence may be considered as a group of frames that are tied to the start and end of the frame capture. Thus, a sequence may include several frames from when a user sits on the toilet, gets up to retrieve something (e.g., toilet paper) and returns to the toilet. Sessions 230 are a group of sequences whose inactivity time is less than two minutes. Finally, episodes 240 are collected from various sessions. Episodes 240 comprise groups of sessions that have clinical significance. As discussed below, this data is among others then used to train the algorithm vis-à-vis ML. Heuristic ML algorithms may be applied to each level. This allows the ML system to filter events of significance or interest, label such events and generate a report.

Figure 3:
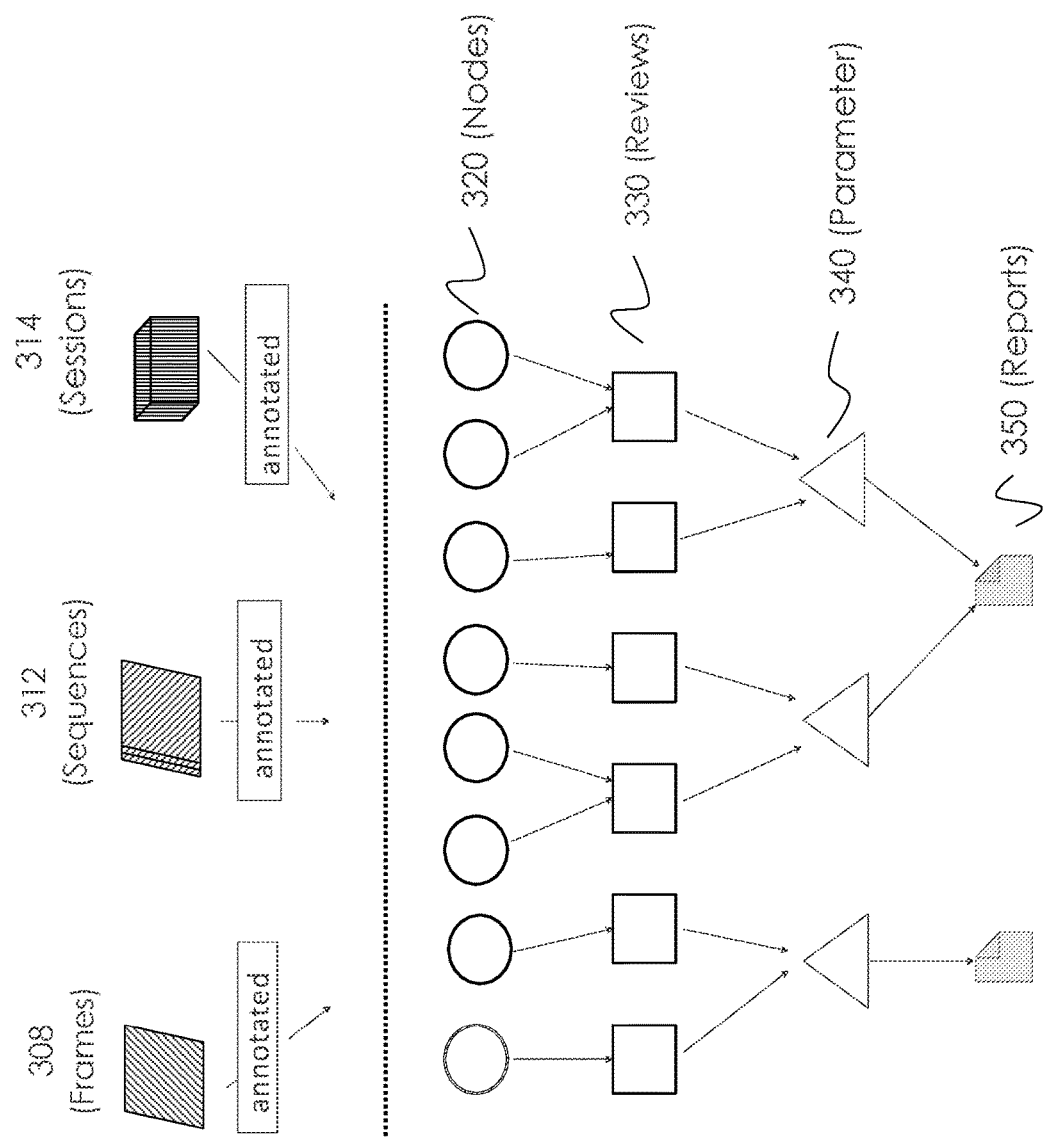
FIG. 3 schematically illustrates an exemplary ML annotation and reporting process.

FIG. 3 schematically illustrates an exemplary ML annotation and reporting process. In FIG. 3, the ML system is filtering events of interest and labeling the events before reporting the filtered and labeled events to human reviewers. It should be noted that while the exemplary embodiment of FIG. 3 suggests human reviewers, the reviewers may be replaced by an AI system that implements the review based on prior training.

In FIG. 3, frames 308, sequences 312 and sessions 314 may be collected from toileting sessions of a particular user. Each of frames 308, sequences 312 and sessions 314 is then annotated by human observers. Next, an observation type and an optional node is assigned to each subject (frame, session or sequence) to describe a clinical or non-clinical condition. This is schematically represented as nodes 320. The nodes are then annotated or combined to form reviews 330. Each review is an observation and is assigned to a frame, sequence or session. Parameters 340 define a group of reviews of events during a fixed time window that show clinical significance. Finally, reports 350 are a group of parameters that are captured in a moment in time. By way of example, if cloudy urine is observed in certain frames, the relevant frames, sequences and sessions may be labeled as showing a cloudy urine and a report may be generated therefrom. The start or the stop of the cloudy urine appearance is denoted by parameter change 340. The parameter change may include such parameter changes as changes denoting clinical (e.g., cloudy urine or blood in the stool) or non-clinical (e.g., regular urination to no urination) characteristics. Additional alerts may be generated when a parameter change is detected. The report may denote an aggregate of all of the parameter changes.

Figure 4:
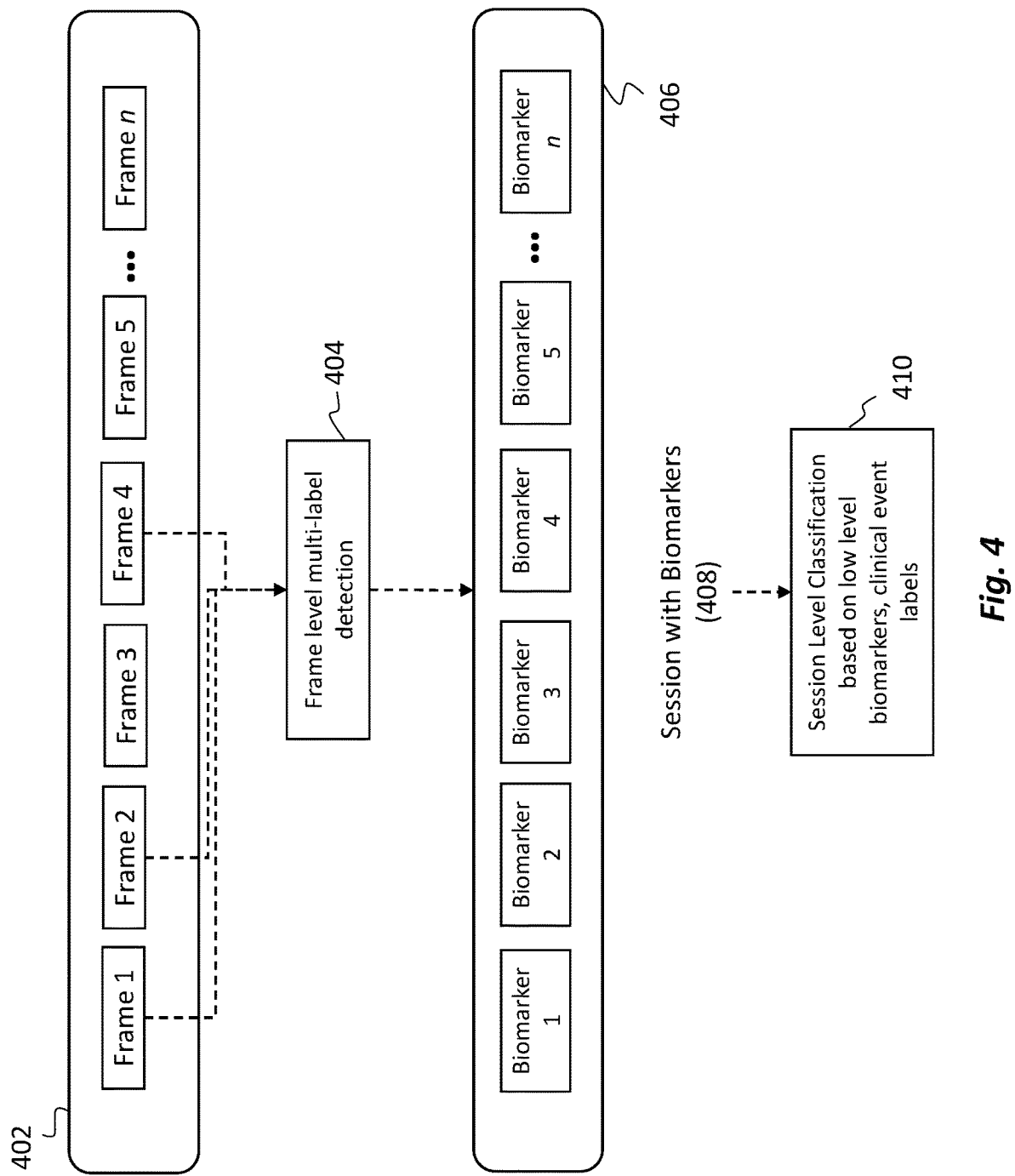
FIG. 4 is an exemplary flow diagram illustrating the machine learning pipeline.

FIG. 4 is an exemplary flow diagram illustrating the machine learning pipeline. FIG. 4 shows that in one embodiment, the ML pipeline is hierarchical. In FIG. 4, frames are shown as group 402. Frames 402 are collected as the user uses the toilet. The frames are numbered 1 through n to denote the time sequence. At hierarchy 404, the frames are labeled by ML to denote a detected characteristic. Hierarchy 402 and 404 show a multi-label classification of biomarkers at the individual frame level using neural networks such as Perceptron, Feed Forward Networks, Multi-Layer Perceptron, Radial Based Networks, Convolutional Neural Networks, Recurrent Neural Networks, and Long Short-Term Memory Networks.

Classification based on the previous stage's output may be used to determine clinical session labels (traditional ML variants such as random forests are outperforming neural network based approaches at this stage). At hierarchy 406, various biomarkers are added as labels to the frames. The process may be extended to identify sessions with biomarkers 408. Session level classification based on low level biomarkers and clinical event labels is shown at 410. That data may be combined at a session level to determine the clinically relevant session labels: frame Level (multi-label classification of biomarkers at the individual frames) and session Level (classification based on the frame level output to determine clinical session labels using ML variants such as random forests).

In one application of the disclosed embodiments, a two stage process is used to identify patient anomalies of interest. The process may comprise the steps of sessionization and machine labeling processes as schematically illustrated in FIGS. 5(A) and 5(B), respectively.

Figure 5A:
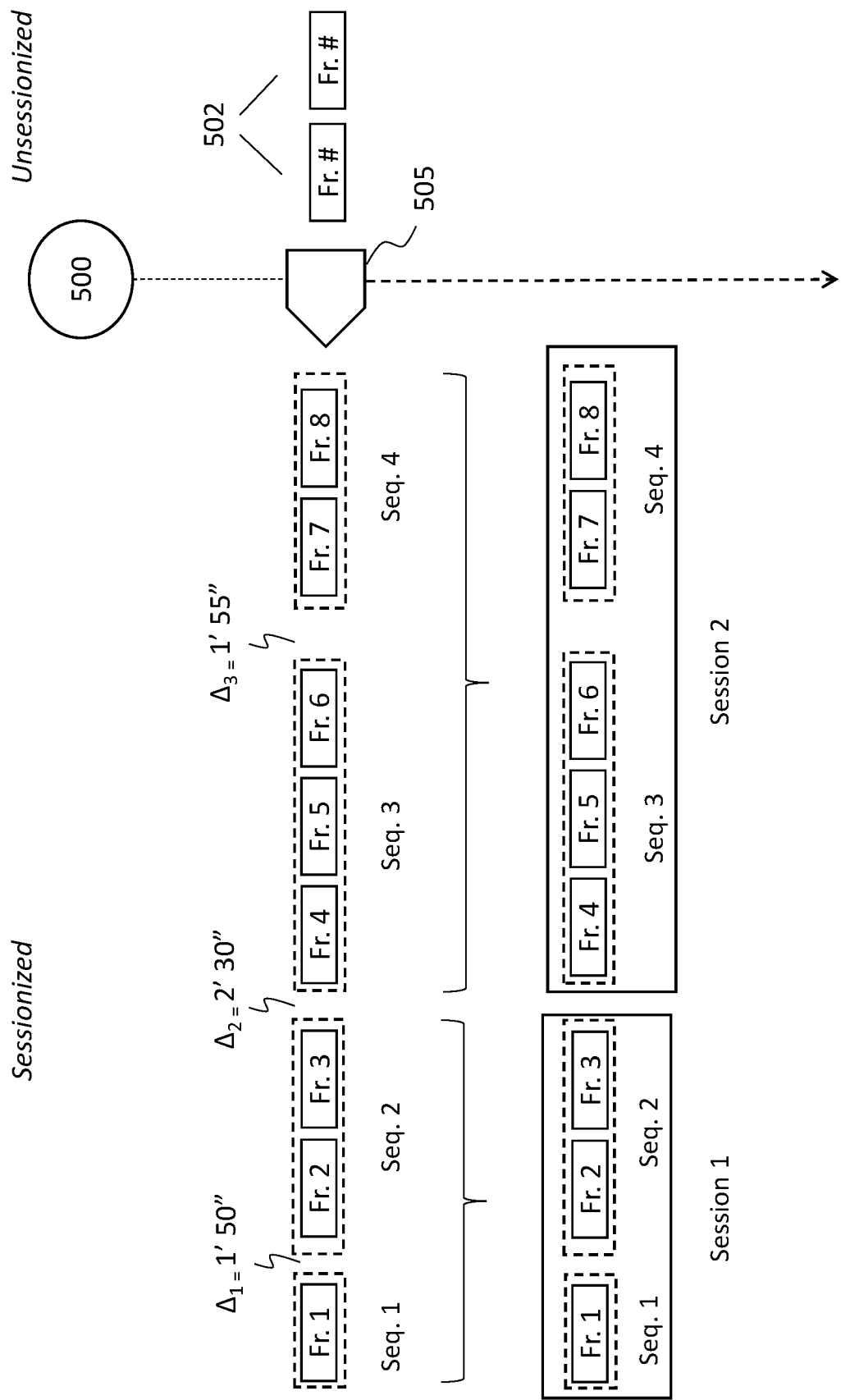
FIG. 5A illustrates an exemplary sessionization process according to one embodiment of the disclosure.
Figure 5B:
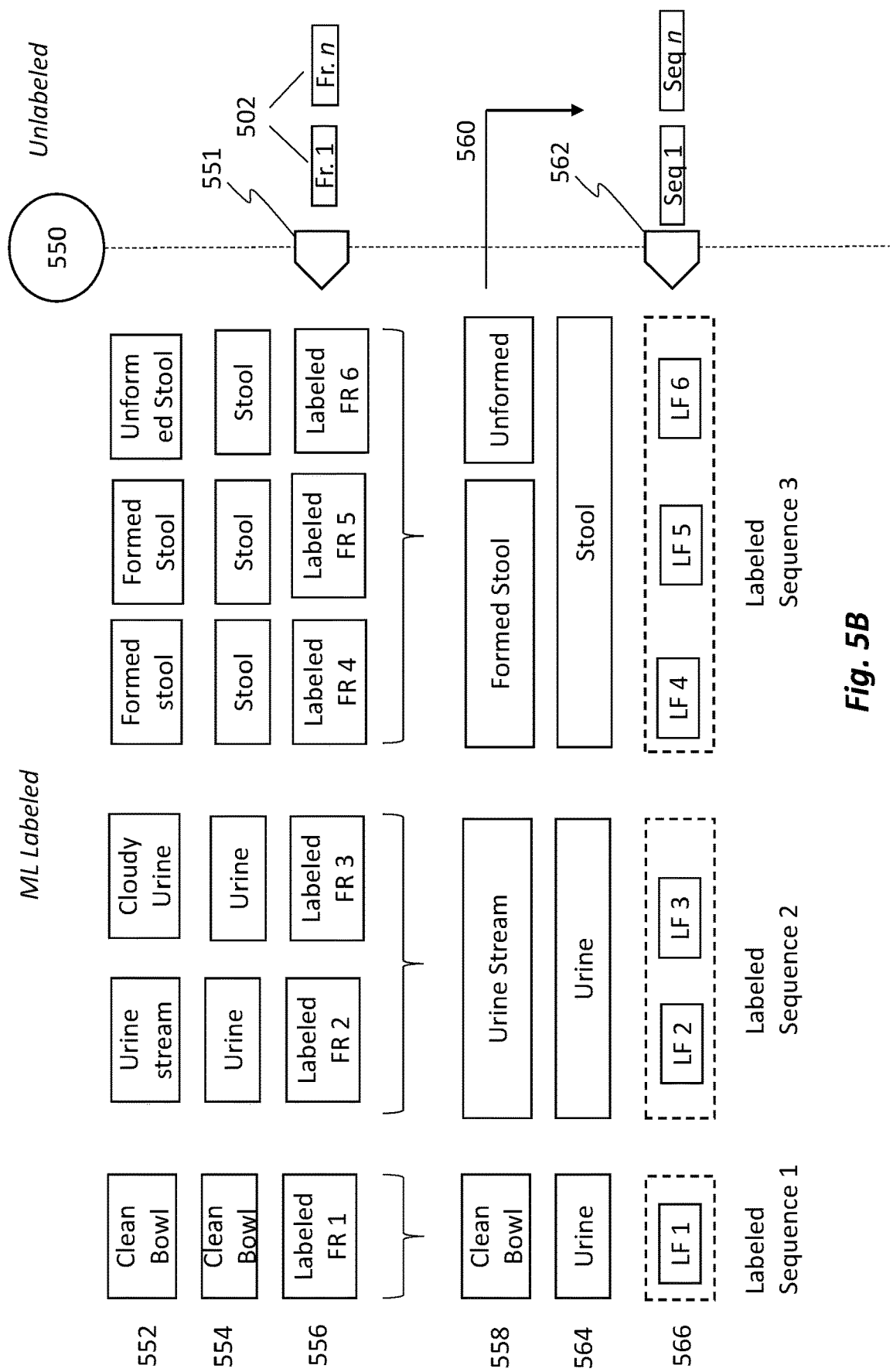
FIG. 5B is a continuation of FIG. 5A and illustrates an exemplary machine labeling (e.g., using ML) or scoring.

FIG. 5A shows an exemplary sessionization process as the first of the two-part process. As described above, sessionization is the process of grouping frames into sequences and sessions based on time series data, behavioral data and personalization data. Time-based sessionization may be static or dynamic. In a static time-based sessionization, a static time interval or session timeout interval is used. The interval may be, for example, 1, 2, 5 or 10 mins.

In FIG. 5A, data pipeline 500 is sessionized and directed to ML system 550 (FIG. 5B) for ML labeling. In this embodiment, frames 502 are directed to a sessionization processor 505. Sessionization processor 505 may comprise circuitry and software configured to receive frames 502 and define sequences and sessions based on predefined parameters. Each frame may have a time stamp associated therewith. The time stamp may denote the frames capture time relative to a clock. The time lapse between the frames' collection is denoted as A in FIG. 5A. The frames are placed into sequences (e.g., Seq. 1-4) according to their time stamp. For example, frame 2 is collected 1 min and 50 seconds after frame 1 is received and frame 3 is collected nearly immediately after frame 2. A lapse of 2 mins and 30 seconds occurs between the collection of frames 3 and 4. Frames 4, 5 and 6 are collected substantially immediately and there is a lapse of 1 min and 55 seconds before frames 7 and 8 are collected. Processor 505 forms sequences as a function of the time stamps. Thus, sequence 1 contains only frame 1; sequence 2 contains frames 2 and 3, sequence 3 contains frames 4, 5 and 6; and sequence 4 contains frames 7 and 8.

Further, processor 505 may sessionize the frames and sequences by comparing the A values against a threshold value (e.g., 2 minutes). Thus, session 1 includes sequences 1 and 2 and session 2 includes sequences 4 through 8. The threshold may be dynamic or other dynamic session timeout threshold may be used. Dynamic timeout interval may be devised for a session as a function of behavioral time period for toileting sessions (i.e., start, end). For example, certain behavioral characteristics of the user may be recognized to define a dynamic threshold. The behavioral characteristics may include, for example, whether a person gets up during a session or falls over without assistance, etc.

FIG. 5B is a continuation of FIG. 5A and illustrates an exemplary machine labeling or scoring by using the ML system according to one embodiment of the disclosure. Specifically, FIG. 5B shows an embodiment where each of the frames, sequences and sessions are labeled using ML trained to identify certain anomalies (e.g., cloudy urine or bloody stool) in the toilet bowl. Here, both time and personal data may be used to label the collected data (frames, sequences, sessions).

The right hand side of FIG. 5B illustrates the unlabeled data as frames and sequences, the left hand side of FIG. 5B shows the ML labeling process and the ML process is schematically illustrated as 550. Optical data collected from the user's toilet session arrives as frames 502. The frames are received at frame labeling processor 552. The frame labeling processor 551 may comprise circuitry and software to label the optical data frames with predefined labels. At row 552 the received frames are organized from left to right in the order of their arrival with the earliest frame on the left (clean bowl), followed by urine stream, cloudy urine, formed stool, formed stool and the most recent frame on the right (unformed stool). Row 554 illustrates labels that match the optical characteristics of each frame. In one embodiment, the labels are selected by frame labeling processor 551. For example, frame labeling processor 551 may depict a clean bowl from the corresponding frame. At row 556, each frame is labeled with its corresponding label to form a labeled frame. The labeled frames are schematically illustrated as row 556. This step may also be implemented by frame labeling processor 551.

The labeled frames 556 are grouped into segments 558. The grouping may be implemented based on a static or dynamic threshold as described in relation to FIG. 5A. One or more of the processors may be used to implement the grouping. The formed sequences may be matched against selected labels as shown at row 560. In one exemplary embodiment, the formed stool and the unformed stool are combined in one sequence.

The formed sequences 558 may be directed to sequence labeling processor 562, which may then match the sequences with sequence labels 564 to form labeled sequences 566. It should be noted that labeled sequences 566 include one or more labeled frames (LF) as illustrated in FIG. 5B. A combination of labeled frames and labeled sequences allow a healthcare professional or an AI to readily compile different frames and sessions in which the user's stool showed an anomaly. It should be also noted that even though frames 4, 5 and 6 include different physical characteristics (i.e., formed and unformed stool), the sequence containing these frames is labeled as stool. A healthcare professional (or AI) reviewing the labeled sequence 3 may be alerted that the physical characteristics of the stool changed within a few frames.

Figure 5C:
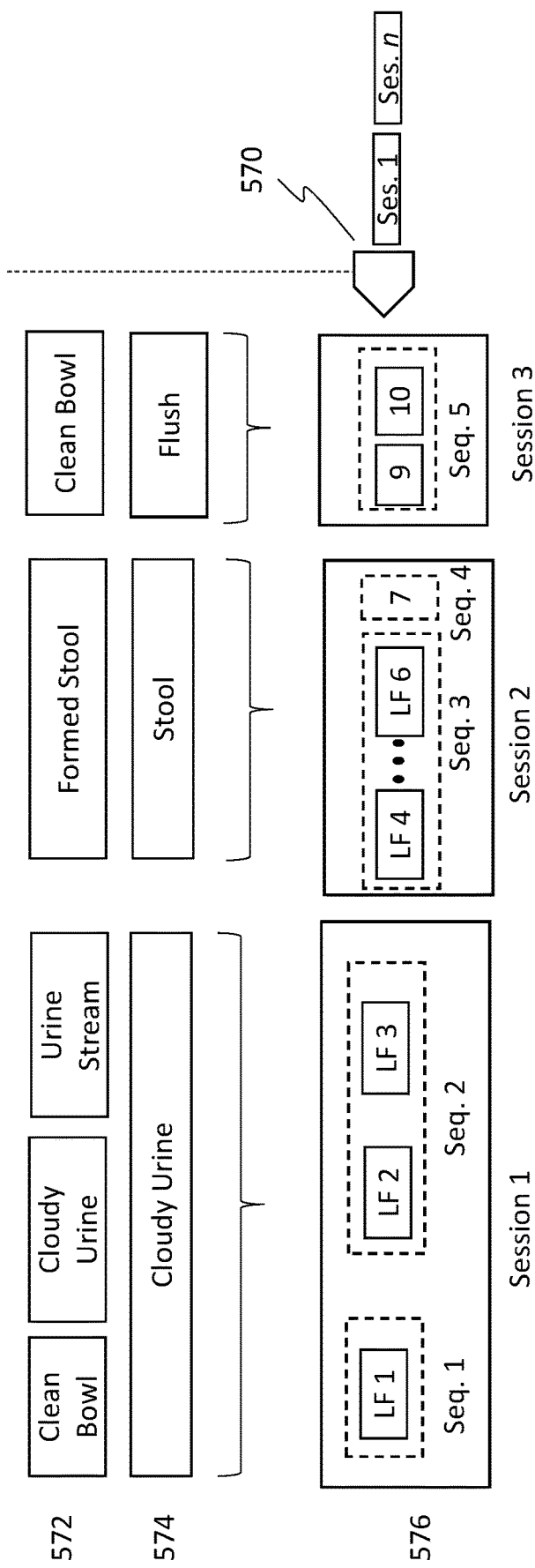
FIG. 5C illustrates the application of the disclosed principles to forming ML labeling to label the user's sessions.

FIG. 5C illustrates the application of the disclosed principles to forming ML labeling to label the user's sessions. Here, machine labeling processor 570 receives sessions 1 to n, as inputs. These sessions are also illustrated at row 572 as clean bowl, cloudy urine, urine stream, formed stool and clean bowl. While a clean bowl label has been added to FIG. 5C, one of ordinary skill in the art would readily understand the application of a clean bowl label to frames and sequences of FIGS. 5A and 5B, respectively. Sessions 572 are matched with session labels 574. Machine labeling processor 570 may provide additional labels as above and match session labels 574. Row 576 illustrates labeled sessions identified as Sessions 1, 2 and 3. Each session may have one or more sequences and one or more frames. The labeled sessions, labeled sequences and labeled frames may be stored at a memory circuit and associated with the user. A user's labeled sessions, for example, over several days may be used to track the user's health or to identify health anomalies.

As discussed in relation to FIG. 4, the sessionization may be static or dynamic. In static sessionization, the ML system determines the start and stop of the session as a function of a predetermined threshold. For example, if the threshold is set at 2 minutes (e.g., timeout), then the session is considered terminated if there is no user activity for more than 2 minutes.

Figure 6:
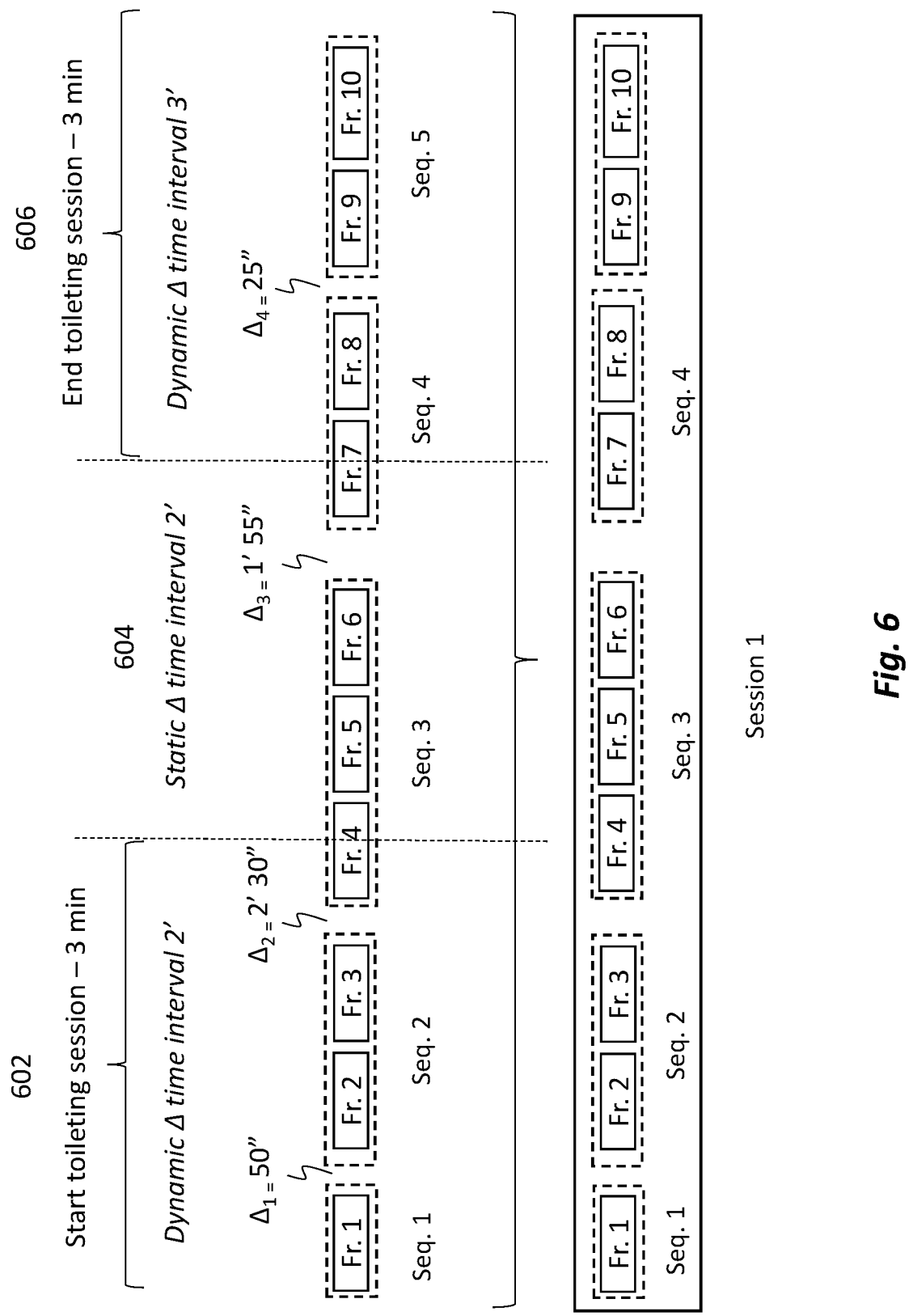
FIG. 6 schematically illustrates dynamic sessionization according to one embodiment of the disclosure.

FIG. 6 schematically illustrates dynamic sessionization according to one embodiment of the disclosure. The dynamic sessionization may be considered a variable time window that changes depending on external variables including the user's particular characteristics. In one embodiment, dynamic sessionization may be viewed as a series of contiguous toileting actions of a user during a given time interval. In an exemplary embodiment, the duration of the start and the ending of the toileting session may be dynamically changed based on external characteristics, including the user's behavior or health peculiarities (e.g., disabled users may require a longer start duration than healthy adults or children).

In FIG. 6, the start of the toileting session may be set to 3 minutes as illustrated by the dynamic start session 602. The start of the toileting session may be triggered by a sensor that detects the user's presence at or near the toilet. The sensor may be configured to change the start of the toileting session depending on the user and the user's specific needs. The actual toileting time, indicated as 604, may also be static or dynamic. In FIG. 6, toileting time 604 is shown with a static time interval (A) of 2 minutes but this may change according to certain predefined parameters. The end of toileting session 606 may also define a dynamic period. As discussed, this portion may be extended or reduced according to the user's needs or abilities. Thus, the illustrative representation of FIG. 6 shows Session 1 as having a total of 8 minutes, which may be shortened or extended according to the user's needs.

Figure 7:
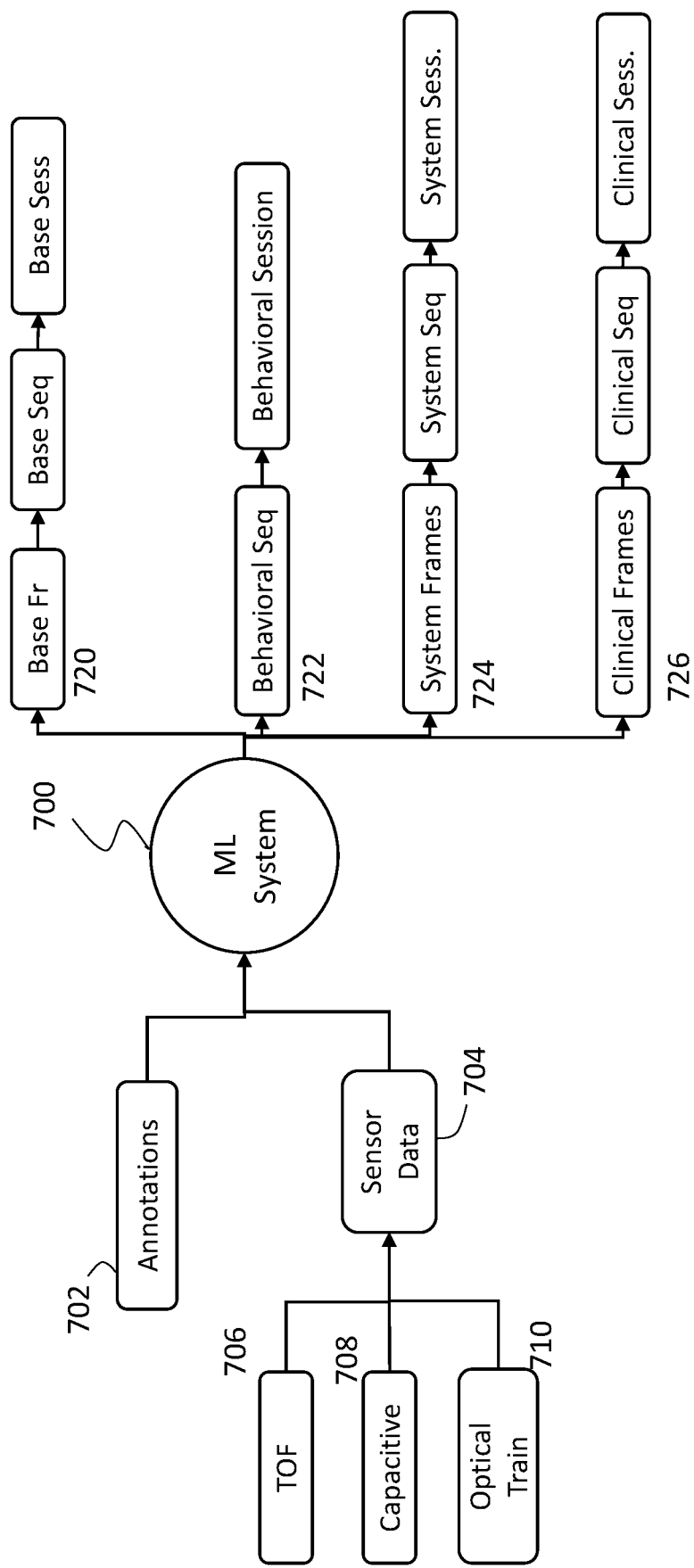
FIG. 7 illustrates an exemplary embodiment of the disclosure for providing information (e.g., training) to the machine learning system.

FIG. 7 illustrates an exemplary embodiment of the disclosure for providing information (e.g., training) to the machine learning system. In FIG. 7, various sensors associated with the toilet provide sensor data 704 to ML system 700. Sensor data may be obtained from sensors gathering time of flight (TOF) information 706, capacitive information 708, and information from the optical train (710). TOF may comprise information relating to the length of an active session. Capacitive sensor may relay information provided from a sensor located on the toilet seat which may be activated when the user is situated on the toilet. Optical train information may comprise frames provided by the optical train situated in the toilet (see FIG. 1). An exemplary TOF sensor may detect whether a user is standing in front of the toilet or sitting on the toilet or if someone is sitting on the commode riser of the toilet. In some embodiment, the TOF sensor may be located on the lid of toilet 111. Certain toilets that have a commode riser (e.g., for individuals who may be unable to squat on the toilet) and the TOF sensor may be placed (e.g., near the toilet) to detect presence of a user on a commode riser.

ML system 700 also receives annotations from the observers. Annotations may comprise frames which are labeled by human observers (e.g., blood in the stool, cloudy urine, clean toilet, etc.)

The output of ML system 700 are labels and is illustrated as labels for frames, sequences and sessions. The exemplary embodiment of FIG. 7 shows four label categories: base 720, behavioral 722, system 724 and clinical 726. Other labels may be added without departing from the disclosed principles. The labels may be added to each frame, sequence and session as needed to provide a comprehensive understanding of the user's toileting behavior and to aid in a potential diagnosis.

The base session 720 may comprise labels for base observations during the toileting session. For example, base session may comprise formed stool, unformed stool, urine present, urine stream present, etc. Behavioral labels 722 may include labels for the user's behavior during a toileting session. This group may comprise labels including, standing urination, sitting urination, non-flushing, flushing, etc. System labels 724 relate to the state of the system during the toileting session. System session may comprise labels including clean bowl, clean lens, dirty bowl, dirty lens, etc. Clinical labels 726 comprise labels for clinical association during toileting session and may comprise, for example, scatolia, blood present, cloudy urine, etc. Referring now to FIGS. 5A-5C and FIG. 7, labels may be added by each of ML processors 552, 562 and 270 along with the various labels outlined in FIG. 7.

By way of an additional example, user's movement during toileting primarily due to how the user wipes with toilet paper can cause multiple sequences. Using multiple sensors and time based sessionization this user behavior can be correctly sessionized. This may be of particular interest for a senior population where assistance in wiping and cleaning may be required. Behaviors such as a delayed or forgotten flush can be sessionized using the ML system and sequence labels. Similarly, failing to flush is a user behavior that can cause incorrect sessionization. To resolve this issue, the prior session data may be fed into the current session's analysis to identify only the new excreta of the new session. In certain embodiments, sessionization may utilize multiple sensor data sets to reduce other user behavior such as walking in front of the toilet or drying after showering (where the shower is near the toilet).

FIG. 8 shows exemplary session rules to account for the user's behavior. Specifically, FIG. 8 shows various examples when user movement (or non-movement) or flushing may affect the label processing. Additional rules for labeling or processing the frame information prior to labeling may be added without departing from the disclosed principles.

Figure 9:
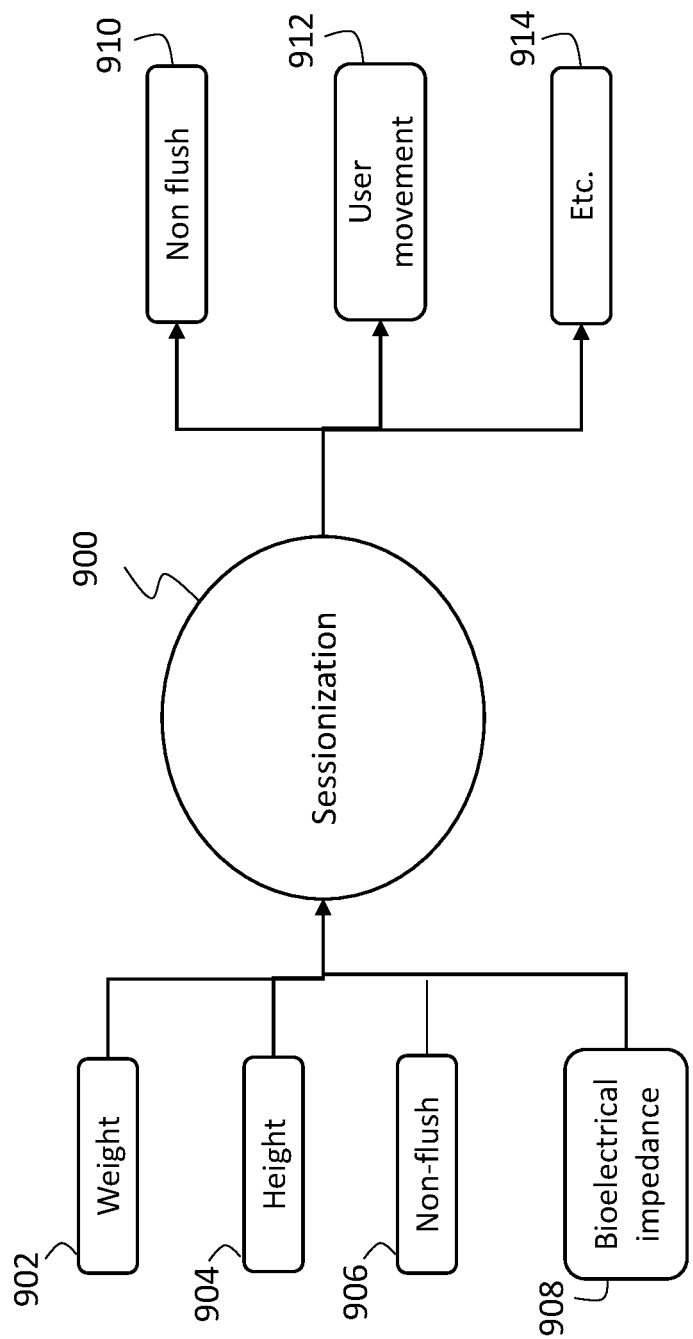
FIG. 9 schematically illustrates an exemplary implementation of personalization rules.

FIG. 9 schematically illustrates an exemplary implementation of personalization rules. The left hand side of FIG. 9 shows input that may be used as user identification metrics. The inputs may comprise the user's personal attributes. One or more of the attributes may be used to identify the user. The exemplary metrics of FIG. 9 include weight (902), height (904), non-flush (805) and bioelectrical impedance (908). Other exemplary metrics, which may be known from the user's profile, include: age, continence status, current medications, mobility, body temperature (as measured by the toilet seat or a thermal scanner), or any other available health information. In an exemplary embodiment, the user's urine voiding volume may be measured and used as a metric. In still another embodiment, the results of a dipstick (or other litmus) test of the user's urine may be used as a metric.

In one embodiment of the disclosure, a watery stool or a constant watery stool may be identified by measuring the bioelectrical impedance of the bowl constituents. Another user metric may be the user's voice (not shown) or fingerprint (not shown). The user may activate the session by personalizing the session. In addition, sessionization may be personalized for a user who does not flush regularly (910). A similar user recognition may be used for a user who needs to sit on the toilet after showering in order to dry. Sessionization may be based on the user's toileting activities. For example, a user who regularly uses the toilet in the morning or in the evening may be identified based on the time of use. The use of personal attributes to identify the user may be of importance when the bathroom is commonly shared in a facility (e.g., nursing home). The right hand side of FIG. 9 relates to actions taken by sessionization processor and the labeling actions comprise, by way of example, non-flush label (910), user movement label (912) and other exemplary labels (914).

Once the frames, sequences and session are annotated, a report may be generated for the user's toileting session. Depending on the desired reporting parameters, the report may include the most recent session or may include several sessions. In one embodiment, the report may trigger an alert if certain parameters are observed in the session. For example, if the user's session indicates significant blood in the stool, a healthcare professional may be notified.

An annotated report may be generated from studying the user's sessions. A filtering session may generate frames of interest for an annotation system. The annotation system may compile the relevant frames of interest for a report. Errors may be detected and corrected before generating the report. For example, if a frame identifies a health anomaly (e.g., bloody stool) but the associated sequence and session's label suggest dirty lens, the ML filtering may account for the anomaly while considering the other physical issues. Finally, the generated sequences may be searched for easy lookup of a patient's trending conditions.

The following examples are provided to further illustrate the application of the disclosed principles to various exemplary embodiments.

Example 1 relates to a method to automatically label toileting acts of a user, the method comprising: activating a sensor to record the toileting acts in a plurality of frames, each frame capturing one or more activities during a discrete time interval and each frame separated from a subsequent frame by a time interval; forming one or more sequences by grouping the frames separated from each other by a substantially constant time interval; and forming one or more sessions by grouping the sequences as a function of a differential interval; labeling each frame by identifying one or more conditions present in the frame; labeling each sequence by identifying one or more conditions present in the plurality of frames in the respective sequence; and labeling each session by identifying one or more conditions present in the plurality of sequences in the respective session.

Example 2 relates to the method of example 1, wherein activating a sensor to record the toileting acts further comprises, activating a capacitive sensor to create start of a toileting session and activating a time-of-flight sensor to engage an optical system to record the toileting session.

Example 3 relates to the method of example 1, further comprising filtering the plurality of frames, sequences and sessions as a function of a predefined condition to generate a condition report.

Example 4 relates to the method of example 3, further comprising directing the condition report to a provider when the condition exceeds a threshold.

Example 5 relates to the method of example 1, wherein the one or more condition is selected to identify a biomarker or a condition marker.

Example 6 relates to the method of example 5, wherein the condition marker is selected from the group consisting of blood in the stool, unformed stool, cloudy urine and blood in the urine.

Example 7 relates to the method of example 1, wherein the condition comprises a physical characteristic of an excrement.

Example 8 relates to the method of example 1, wherein the threshold is determined dynamically as a function of one or more user characteristics.

Example 9 relates to the method of example 8, wherein the one or more characteristics comprises age, weight and mobility.

Example 10 relates to the method of example 1, wherein the sensors capture the user's activities on a toilet using an optical train and circuitry to receive and store image data.

Example 11 relates to the method of example 1, wherein the frame comprises an optical image of one or more of the user's excrement or urine.

Example 12 relates to a system to automatically label toileting acts of a user, the system comprising: a processor circuitry; a memory circuitry in communication with the processor circuitry, the memory circuitry configured with instructions to cause the processor circuitry to automatically label toileting acts of the user by: activate a sensor to record the toileting acts in a plurality of frames, each frame capturing one or more activities during a discrete time interval and each frame separated from a subsequent frame by a time interval; form one or more sequences by grouping the frames separated from each other by a substantially constant time interval; and form one or more sessions by grouping the sequences as a function of a differential interval; label each frame by identifying one or more conditions present in the frame; label each sequence by identifying one or more conditions present in the plurality of frames in the respective sequence; and label each session by identifying one or more conditions present in the plurality of sequences in the respective session.

Example 13 is directed to the system of example 12, wherein the memory circuitry further comprises instructions to activate the sensor to record the toileting acts by activating a capacitive sensor to create start of a toileting session and activating a time-of-flight sensor to engage an optical system to record the toileting session.

Example 14 is directed to the system of example 12, further comprising filtering the plurality of frames, sequences and sessions as a function of a predefined condition to generate a condition report.

Example 15 is directed to the system of example 14, further comprising directing the condition report to a provider when the condition exceeds a threshold.

Example 16 is directed to the system of example 12, wherein the one or more condition is selected to identify a biomarker or a condition marker.

Example 17 is directed to the system of example 16, wherein the condition marker is selected from the group consisting of blood in the stool, unformed stool, cloudy urine and blood in the urine.

Example 18 is directed to the system of example 12, wherein the condition comprises a physical characteristic of an excrement.

Example 19 is directed to the system of example 12, wherein the threshold is determined dynamically as a function of one or more user characteristics.

Example 20 is directed to the system of example 19, wherein the one or more characteristics is selected from the group consisting of ser's age, continence status, current medications, mobility, body temperature or any other available health information.

Example 21 is directed to the system of example 12, wherein the sensors capture the user's activities on a toilet using an optical train and circuitry to receive and store image data.

Example 22 is directed to the system of example 12, wherein the frame comprises an optical image of one or more of the user's excrement or urine.

Example 23 is directed to a method to form machine learning (ML) sessions from a user's activities, the method comprising: receiving a plurality of frames from a sensor, each frame capturing one or more activities during a discrete time interval and each frame separated from a subsequent frame by a time interval; forming one or more sequences by grouping the frames separated from each other by a substantially constant time interval; and forming one or more sessions by grouping the sequences as a function of a differential interval that exceeds a threshold.

Example 24 is directed to the method of example 23, wherein the threshold is static and is determined apriori.

Example 25 is directed to the method of example 23, wherein the threshold is dynamic.

Example 26 is directed to the method of example 25, wherein the threshold is determined dynamically as a function of one or more user characteristics.

Example 27 is directed to the method of example 26, wherein the one or more characteristics is selected from the group consisting of ser's age, continence status, current medications, mobility, body temperature or any other available health information.

Example 28 is directed to the method of example 23, wherein the frames are collected by one or more sensors to capture the user's activities on a toilet.

Example 29 is directed to the method of example 23, wherein the frame comprises an optical image of one or more of the user's excrement or urine.

Example 30 is directed to a system to form machine learning (ML) sessions from a user's activities, the system comprising: a processor circuitry; a memory circuitry in communication with the processor circuitry, the memory circuitry configured with instructions to cause the processor circuitry to: receive a plurality of frames from a sensor, each frame capturing one or more activities during a discrete time interval and each frame separated from a subsequent frame by a substantially constant time interval; form one or more sequences by grouping the frames separated from each other by a differential interval; and form one or more sessions by grouping the sequences as a function of a differential interval that exceeds a threshold.

Example 31 is directed to the system of example 30, wherein the threshold is static and is determined apriori.

Example 32 is directed to the system of example 30, wherein the threshold is dynamic.

Example 33 is directed to the system of example 32, wherein the threshold is determined dynamically as a function of one or more user characteristics.

Example 34 is directed to the system of example 33, wherein the one or more characteristics is selected from the group consisting of ser's age, continence status, current medications, mobility, body temperature or any other available health information.

Example 35 is directed to the system of example 30, wherein the frames are collected by one or more sensors to capture the user's activities on a toilet.

Example 36 is directed to the system of example 30, wherein the frame comprises an optical image of one or more of the user's excrement or urine.

Example 37 is directed to a non-transitory computer-readable medium comprising a processor circuitry and a memory circuitry in communication with the processor circuitry and including instructions to form machine learning (ML) sessions from a user's activities, the memory circuitry further comprising instructions to cause the processor to: receive a plurality of frames from a sensor, each frame capturing one or more activities during a discrete time interval and each frame separated from a subsequent frame by a substantially constant time interval; form one or more sequences by grouping the frames separated from each other by a differential interval; and form one or more sessions by grouping the sequences as a function of a differential interval that exceeds a threshold.

Example 38 is directed to the medium of example 37, wherein the threshold is static and is determined apriori.

Example 39 is directed to the medium of example 37, wherein the threshold is dynamic.

Example 40 is directed to the medium of example 39, wherein the threshold is determined dynamically as a function of one or more user characteristics.

Example 41 is directed to the medium of example 40, wherein the one or more characteristics is selected from the group consisting of ser's age, continence status, current medications, mobility, body temperature or any other available health information.

Example 42 is directed to the medium of example 37, wherein the frames are collected by one or more sensors to capture the user's activities on a toilet.

Example 43 is directed to the medium of example 37, wherein the frame comprises an optical image of one or more of the user's excrement or urine.

What is claimed is:

1. A method to automatically label toileting acts of a user, the method comprising:
   activating a sensor to record the toileting acts in a plurality of frames, each frame capturing one or more activities during a discrete time interval and each frame separated from a subsequent frame by a time interval;
   forming one or more sequences by grouping the frames separated from each other by a substantially constant time interval; and
   forming one or more sessions by grouping the sequences as a function of a differential interval;
   labeling each frame by identifying one or more conditions present in the frame;
   labeling each sequence by identifying one or more conditions present in the plurality of frames in the respective sequence; and
   labeling each session by identifying one or more conditions present in the plurality of sequences in the respective session.

2. The method of claim 1, wherein activating a sensor to record the toileting acts further comprises, activating a capacitive sensor to create start of a toileting session and activating a time-of-flight sensor to engage an optical system to record the toileting session.

3. The method of claim 1, further comprising filtering the plurality of frames, sequences and sessions as a function of a predefined condition to generate a condition report.

4. The method of claim 3, further comprising directing the condition report to a provider when the condition exceeds a threshold.

5. The method of claim 1, wherein the one or more condition is selected to identify a biomarker or a condition marker.

6. The method of claim 5, wherein the condition marker is selected from the group consisting of blood in the stool, unformed stool, cloudy urine and blood in the urine.

7. The method of claim 1, wherein the condition comprises a physical characteristic of an excrement.

8. The method of claim 1, wherein the threshold is determined dynamically as a function of one or more user characteristics.

9. The method of claim 8, wherein the one or more characteristics comprises age, weight and mobility.

10. The method of claim 1, wherein the sensors capture the user's activities on a toilet using an optical train and circuitry to receive and store image data.

11. The method of claim 1, wherein the frame comprises an optical image of one or more of the user's excrement or urine.

12. A system to automatically label toileting acts of a user, the system comprising:
    a processor circuitry;
    a memory circuitry in communication with the processor circuitry, the memory circuitry configured with instructions to cause the processor circuitry to automatically label toileting acts of the user by:
       activate a sensor to record the toileting acts in a plurality of frames, each frame capturing one or more activities during a discrete time interval and each frame separated from a subsequent frame by a time interval;
       form one or more sequences by grouping the frames separated from each other by a substantially constant time interval; and
       form one or more sessions by grouping the sequences as a function of a differential interval;
       label each frame by identifying one or more conditions present in the frame;
       label each sequence by identifying one or more conditions present in the plurality of frames in the respective sequence; and
       label each session by identifying one or more conditions present in the plurality of sequences in the respective session.

13. The system of claim 12, wherein the memory circuitry further comprises instructions to activate the sensor to record the toileting acts by activating a capacitive sensor to create start of a toileting session and activating a time-of-flight sensor to engage an optical system to record the toileting session.

14. The system of claim 12, further comprising filtering the plurality of frames, sequences and sessions as a function of a predefined condition to generate a condition report.

15. The system of claim 14, further comprising directing the condition report to a provider when the condition exceeds a threshold.

16. The system of claim 12, wherein the one or more condition is selected to identify a biomarker or a condition marker.

17. The system of claim 16, wherein the condition marker is selected from the group consisting of blood in the stool, unformed stool, cloudy urine and blood in the urine.

18. The system of claim 12, wherein the condition comprises a physical characteristic of an excrement.

19. The system of claim 12, wherein the threshold is determined dynamically as a function of one or more user characteristics.

20. The system of claim 19, wherein the one or more characteristics is selected from the group consisting of ser's age, continence status, current medications, mobility, body temperature or any other available health information.

21. The system of claim 12, wherein the sensors capture the user's activities on a toilet using an optical train and circuitry to receive and store image data.

22. The system of claim 12, wherein the frame comprises an optical image of one or more of the user's excrement or urine.

23. A method to form machine learning (ML) sessions from a user's activities, the method comprising:
   receiving a plurality of frames from a sensor, each frame capturing one or more activities during a discrete time interval and each frame separated from a subsequent frame by a time interval;
   forming one or more sequences by grouping the frames separated from each other by a substantially constant time interval; and
   forming one or more sessions by grouping the sequences as a function of a differential interval that exceeds a threshold;
   wherein the threshold is determined as a static threshold or a dynamic threshold.

24. The method of claim 23, wherein the static threshold is determined apriori.

25. The method of claim 23, wherein the dynamic threshold is determined as a function of one or more user characteristics.

26. The method of claim 25, wherein the one or more characteristics is selected from the group consisting of ser's age, continence status, current medications, mobility, body temperature or any other available health information.

27. The method of claim 23, wherein the frames are collected by one or more sensors to capture the user's activities on a toilet.

28. The method of claim 23, wherein the frame comprises an optical image of one or more of the user's excrement or urine.

29. A system to form machine learning (ML) sessions from a user's activities, the system comprising:
   a processor circuitry;
   a memory circuitry in communication with the processor circuitry, the memory circuitry configured with instructions to cause the processor circuitry to:
      receive a plurality of frames from a sensor, each frame capturing one or more activities during a discrete time interval and each frame separated from a subsequent frame by a substantially constant time interval;
      form one or more sequences by grouping the frames separated from each other by a differential interval; and
      form one or more sessions by grouping the sequences as a function of a differential interval that exceeds a threshold;
      wherein the threshold is determined as a static threshold or a dynamic threshold.

30. The system of claim 29, wherein the static threshold is determined apriori.

31. The system of claim 29, wherein the threshold is dynamic.

32. The system of claim 31, wherein the dynamic threshold is determined as a function of one or more user characteristics.

33. The system of claim 32, wherein the one or more characteristics is selected from the group consisting of ser's age, continence status, current medications, mobility, body temperature or any other available health information.

34. The system of claim 29, wherein the frames are collected by one or more sensors to capture the user's activities on a toilet.

35. The system of claim 29, wherein the frame comprises an optical image of one or more of the user's excrement or urine.

36. A non-transitory computer-readable medium comprising a processor circuitry and a memory circuitry in communication with the processor circuitry and including instructions to form machine learning (ML) sessions from a user's activities, the memory circuitry further comprising instructions to cause the processor to:
   receive a plurality of frames from a sensor, each frame capturing one or more activities during a discrete time interval and each frame separated from a subsequent frame by a substantially constant time interval;
   form one or more sequences by grouping the frames separated from each other by a differential interval; and
   form one or more sessions by grouping the sequences as a function of a differential interval that exceeds a threshold;
   wherein the threshold is determined as a static threshold or a dynamic threshold.

37. The medium of claim 36, wherein the static threshold is determined apriori.

38. The medium of claim 36, wherein the dynamic threshold is determined as a function of one or more user characteristics.

39. The medium of claim 38, wherein the one or more characteristics is selected from the group consisting of ser's age, continence status, current medications, mobility, body temperature or any other available health information.

40. The medium of claim 36, wherein the frames are collected by one or more sensors to capture the user's activities on a toilet.

41. The medium of claim 36, wherein the frame comprises an optical image of one or more of the user's excrement or urine.

* * * * *